| United States Patent [19] | [11] Patent Number: 4,927,306 |
|---|---|
| Sato | [45] Date of Patent: May 22, 1990 |

[54] SCREW GROMMET

[75] Inventor: Seiichi Sato, Yokohama, Japan

[73] Assignee: Kato Hatsujo Kaisha, Ltd., Yokohama, Japan

[21] Appl. No.: 195,905

[22] Filed: May 18, 1988

[51] Int. Cl.⁵ .................... F16B 19/00; F16B 37/04
[52] U.S. Cl. .................................. 411/182; 411/510; 411/913
[58] Field of Search ............ 411/15, 84, 85, 112, 411/182, 508–510, 913, 970, 369; 24/293, 297, 453

[56] References Cited

U.S. PATENT DOCUMENTS

| 2,788,047 | 4/1957 | Rapata . | |
| 2,836,215 | 5/1958 | Rapata . | |
| 3,087,370 | 4/1963 | Iaia | 411/369 |
| 3,481,242 | 12/1969 | Topf | 411/510 |
| 3,842,709 | 10/1974 | Fuqua | 411/508 |
| 4,077,300 | 3/1978 | Yoda | 411/15 |
| 4,133,246 | 1/1979 | Small | 411/182 |
| 4,521,148 | 6/1985 | Tanaka | 411/182 |

FOREIGN PATENT DOCUMENTS

| 2813749 | 10/1978 | Fed. Rep. of Germany | 411/182 |
| 2499177 | 8/1982 | France | 411/182 |

Primary Examiner—Neill R. Wilson
Attorney, Agent, or Firm—Wenderoth, Lind & Ponack

[57] ABSTRACT

A screw grommet of synthetic resin having an enlarged head part adapted for abutment against the surface of a mounting panel, a shank adapted for engagement with an oblong fitting hole bored in the mounting panel, a pair of integral shoulders extending from opposite walls of the shank, and a pair of integral elastic arms extending at a prescribed angle from the other pair of opposite walls of the shank. The pair of elastic arms and the pair of engaging shoulders engage with the corresponding edges of the oblong fitting hole in the mounting panel. The screw grommets are always retained in the correct posture in the oblong fitting holes and absorb errors in manufacture or fabrication. The screw grommets are also capable of absorbing variations in the relative positions of the fitting holes in the panel and the through-holes in a part to be attached caused by expansion or contraction due to a change in temperature.

10 Claims, 4 Drawing Sheets

SCREW GROMMET

BACKGROUND OF THE INVENTION AND PRIOR ART STATEMENT

This invention relates to a screw grommet made of synthetic resin, and more particularly to a screw grommet which is so adapted that when it is used to fix on a mounting panel a varying part made of synthetic resin and, therefore, disposed to undergo thermal expansion or thermal shrinkage due to change of the atmospheric temperature, it will infallibly absorb a possible error of manufacture or fabrication imparted to the mounting panel, enable itself to be automatically slid to the center of a fitting hole bored in the mounting panel and, at the same time, infallibly absorb a variation possibly brought about in the position thereof relative to the mounting panel by thermal expansion or thermal shrinkage of the part of synthetic resin.

A conventional screw grommets is disclosed in U.S. Pat. No. 2,788,047.

This particular conventional grommet is a one-piece article of synthetic resin which, though not specifically illustrated, comprises an enlarged head part adapted to abut against the surface of a mounting panel, a shank part adapted to engage a fitting hole bored in the mounting panel, and a screw socket extending from the head part into the shank so as to permit insertion therein of a screw member. Actual use of this shaped article in the fixation of a given part to a mounting panel is attained by inserting the shank of the shaped article into a fitting hole bored in the mounting panel, aligning a throughhole bored in the part with the opening of the screw socket, and driving a screw member past the through hole into the screw socket thereby causing the wall of the shank to be radially expanded and brought into fast engagement with the edge of the fitting hole, with the result that the part is fastened to the mounting panel.

Generally the mounting panel is provided with a plurality of such fitting holes and the part is likewise provided with as many throughholes as the fitting holes. Where a spacing error due to manufacture or fabrication occurs between the positions of the fitting holes, and those of the through holes or a similar dimensional error between the diameters of the holes and those of the grommet shanks, it is frequently observed that conventional grommets cannot be fitted in a correct posture in the corresponding fitting holes but are instead fitted in an oblique posture therein without reference to the discrimination between the two sorts of errors mentioned above because these grommets are devoid of any means or structure capable of absorbing the error.

The conventional grommets, therefore, have had the disadvantage that once they are fitted obliquely in the fitting holes, the parts destined finally to be fixed on the mounting panel are fixed with very poor stability on the panel and, where correction is required, the work of refixation becomes highly complicated.

An improved grommet disclosed in U.S. Pat. No. 2,836,215, for example, has been proposed to solve the situation. Basically, this improved grommet is similar to the aforementioned conventional grommet in the sense that it is provided with an enlarged head part, a shank, and a screw socket extending from the head part into the shank to permit insertion therein of a screw member. Distinctly, however, this improved grommet is additionally provided with a pair of enaging pieces disposed on the opposite outer sides of the shank and raised upwardly along the length of the shank, so that the fast engagement of the grommet shank with a fitting hole in a mounting panel is accomplished by causing the upper edges of the engaging pieces to be abutted elastically against the edge of the fitting hole.

This improved grommet, therefore, is capable of thoroughly absorbing a dimensional error between the diameter of the fitting hole and that of the shank because the pair of engaging pieces raised upwardly as described above are allowed to be bent to some extent by virtue of the spaces defined by the inner surfaces of the engaging pieces and the outer surface of the shank. Since these engaging pieces are intended exclusively as means for the engagement of the grommet shank and the fitting hole, however, they are incapable of efficiently and infallibly absorbing the spacing error possibly occurring between the positions of the fitting holes and those of the through holes.

Where a spacing error occurs between the positions of the fitting holes and those of the through holes, therefore, the improved grommet is incapable of absorbing this spacing error and is therefore not fitted in a correct posture in the fitting hole, but is fitted in an oblique posture therein. The disadvantage of the conventional grommet that the part is fixed with poor stability on the mounting panel and, where a correction is required, the work of refixation itself becomes complicated is not solved by this improved grommet.

Particularly where the part given to be fixed on the mounting panel happens to be made of synthetic resin, a substance liable to undergo thermal expansion or thermal shrinkage due to change in the atmospheric temperature, it is undeniable that the part, after the fixation on the panel, has the possibility of being thermally expanded or thermally shrunken by change in the ambient temperature and consequently inducing relative variation between the positions of the fitting hole and the through hole. Since the improved grommet is likewise devoid of any means for effecting efficient absorption of the variation in the positions of the holes due to change in the ambient temperature, it has a disadvantage in that the fixation of the part is eventually deprived of stability.

Moreover, in the use of the screw grommet, it has been customary to ensure a waterproofing effect and shock-absorbing effect to the intervening space between the enlarged head part and the mounting panel by attaching a packing material made of sponge sheet, for example, to the lower surface side of the enlarged head part thereby interposing the packing material between the lower surface of the enlarged head part and the upper surface of the mounting panel. Thus, the former conventional grommet and the latter improved grommet have the common disadvantage that once they are fitted in an oblique posture in the fitting holes of the mounting panels, they cannot rely fully upon the waterproofing and shock-absorbing effect of the packing material because the packing material is compressed unevenly between the enlarged head part and the mounting panel.

OBJECT AND SUMMARY OF THE INVENTION

A primary object of this invention is to provide a novel screw grommet which infallibly absorbs error due to manufacture and fabrication, always enables itself to be fitted in a correct posture in a fitting hole of a mounting panel and, at the same time, infallibly absorbs variation possibly caused in the relative positions of the fitting hole on the panel and the through hole on the part by thermal expansion or thermal shrinkage of the part as a consequence of a change in the atmospheric temperature.

To accomplish the object described above, this invention contemplates as a technical premise thereof a screw grommet of synthetic resin provided with an enlarged head part adapted to abut against the surface of a mounting panel, a shank for insertion in a fitting hole bored in the mounting panel, and a screw socket extending from the enlarged head part into the shank so as to permit insertion therein of a screw member intended to fix a part formed of synthetic resin on the mounting panel. The shank extends downwardly from the lower surface to the enlarged head part and has a substantially rectangular cross-section defined by a pair of opposed walls having a large width and a pair of opposed walls having a small width, and has a pair of integral engaging shoulders extending from the opposed walls having a large width and a pair of integral elastic arms extending at a prescribed angle from the opposed walls having a small width. The pair of elastic arms and the pair of engaging shoulders are adapted to engage with the opposed edges of the rectangular fitting hole bored in the mounting panel. The walls of the shank having a large width have a decreased thickness in the upper portions thereof where the engaging shoulders are formed on the outer surfaces of the walls, thereby giving rise to an upwardly widening space defined by the inner surfaces of the opposed walls having a large width.

This invention also contemplates a screw grommet having integral posture retaining ribs, for abutting against the surface of the mounting panel extending from the lateral edges of the lower surface of the enlarged head part and an attached packing material inside an empty space defined by the posture-retaining ribs and the lower surface of the head part.

The other objects and characteristics of the present invention will be described in detail below with reference to the accompanying drawings.

DETAILED DESCRIPTION OF THE INVENTION

Now, the present invention will be described more specifically below with reference to working examples illustrated in the accompanying drawings.

Figure 1:
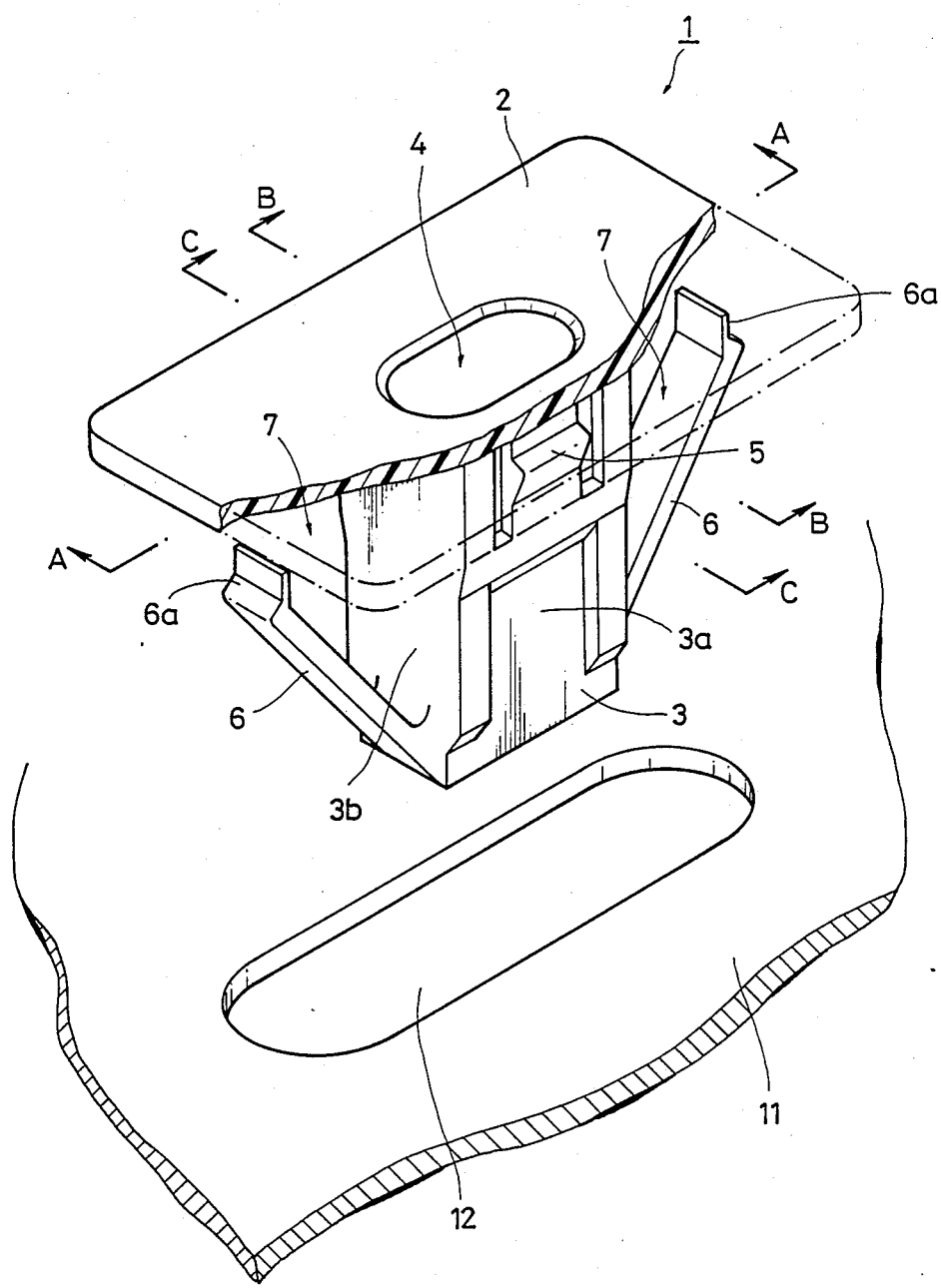
FIG. 1 is a partially cutaway perspective view illustrating essential parts of a screw grommet of the first embodiment of the present invention and a fitting hole in a mounting panel.
Figure 2A:
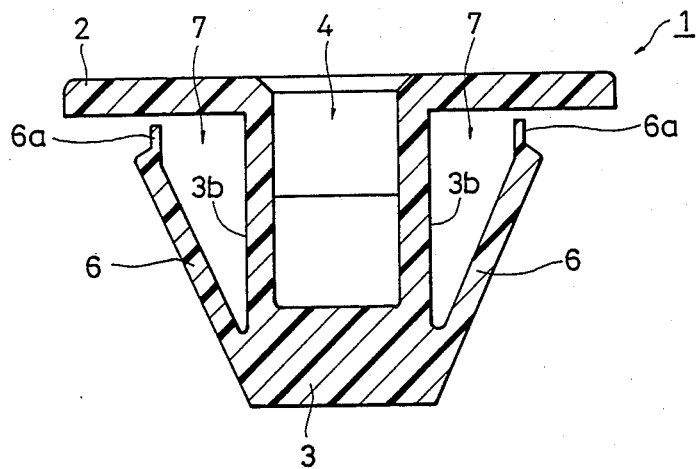
FIG. 2A is a cross section taken through FIG. 1 along the line A—A.

A screw grommet 1 of the first embodient of this invention is molded integrally of synthetic resin similarly to conventional screw grommets and is provided, as illustrated in FIG. 1 and FIG. 2A, B, and C, with an enlarged head part 2 adapted to abut against the surface of a mounting panel 11 and a shank 3 adapted to engage a fitting hole 12 bored in the mounting panel 11.

Specifically, the shank 3 extends downwardly from the lower surface fo the rectangular enlarged head part 2 and has a substantially rectangular cross-section defined by walls 3a having a large width and walls 3b having a small width. An oblong screw socket 4 for insertion of a screw member extends inwardly from the enlarged head part 2 into the shank 3. An upper portion of each of the opposed walls 3a includes an engaging shoulder 5 adapted to engage the edge of a fitting hole 12. A lower portion of each of the opposed walls 3b includes an elastic arm 6 extending therefrom at a prescribed angle, with each arm 6 having a stepped under end 6a adapted for elastic engagement with the edge of the fitting hole 12.

The pair of elastic arms 6, as illustrated, have only the lower ends thereof integrally connected to the walls 3b of the shank 3. In the remaining portions of the elastic arms 6, empty spaces 7 are defined by the inner surfaces of the arms 6 and the surfaces of the walls 3b. By virtue of the empty spaces, the elastic arms 6 are allowed to bend to a great extent.

Figure 2B:
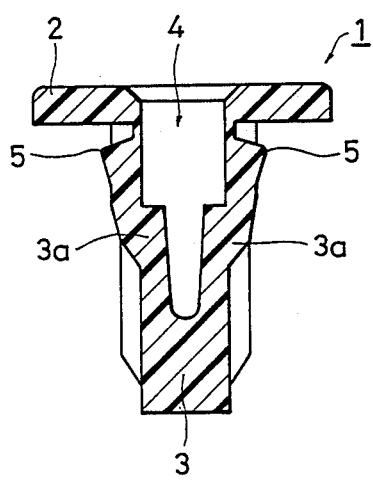
FIG. 2B is a cross section taken through FIG. 1 along the line B—B.
Figure 2C:
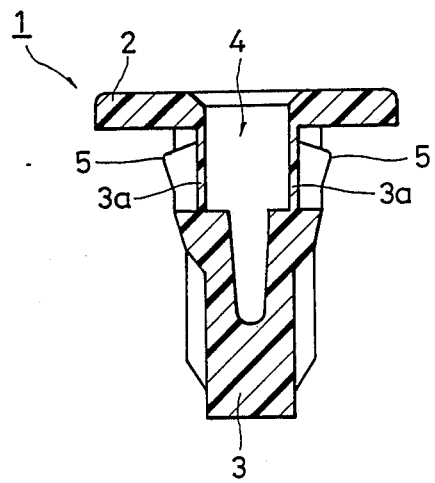
FIG. 2C is a cross section taken through FIG. 1 along the line C—C.
Figure 3:
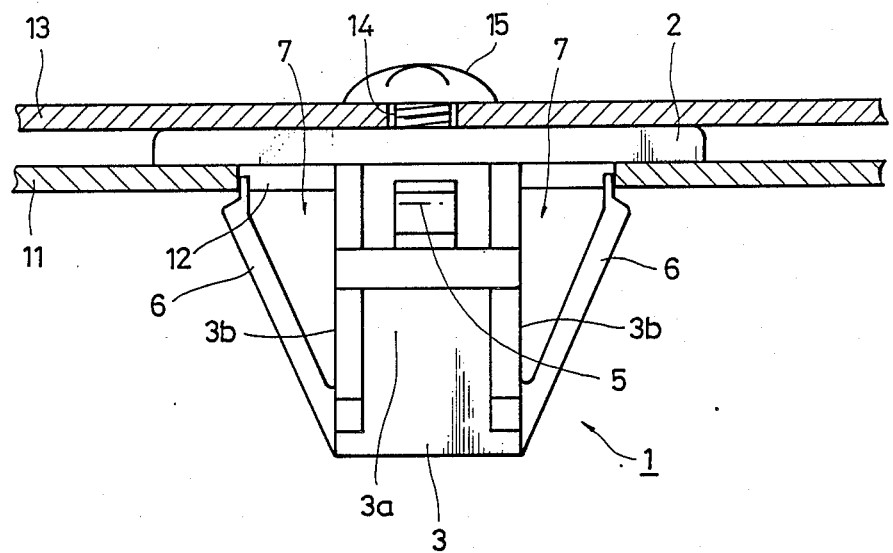
FIG. 3 is a front view illustrating in a partially sectioned schematic form the condition in which a part is fixed on a mounting panel by the use of the screw grommet of the first embodiment.
Figure 4:
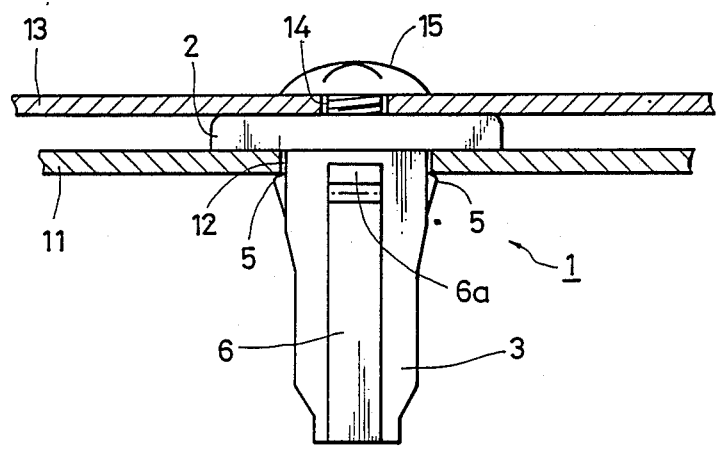
FIG. 4 is a side view illustrating in a partially sectioned schematic form the condition of FIG. 3.

The thickness of each of the walls 3a, as illustrated in FIG. 2B and C, is decreased in the upper portions thereof, with the engaging shoulders 5 extending integrally from the outer surfaces of the portions of decreased thickness. The thickness is increased in the lower portions of the walls, with the portions of the walls having an increased thickness being bulged in the direction of the screw socket 4. The opposed walls 3a 3 are forcibly spread outward at the lower portions thereof by the insertion of a screw member between the inner surfaces of the portions of the walls having an increased thickness.

To fix a part of synthetic resin on the mounting panel 11 in a superposed state by the use of the screw grommet 1, a plurality of oblong fitting holes 12 for engagement with the shank 3 are first bored, suitably spaced, in the panel and the shanks 3 of as many grommets 1 are inserted into respective ones of the oblong fitting holes 12. In this case, the diameter of the oblong fitting hole 12 in the longitudinal direction is smaller than the distance between the leading ends 6a of the pair of elastic arms 6.

Consequently, the pair of elastic arms 6 disposed on the walls 3b of the shank 3 pass through the interior of the oblong fitting hole 12 and are bent inwardly by virtue of the empty spaces 7 to bring the upper parts 6a thereof into elastic engagement with the longitudinally opposed edges of the fitting hole 12. At the same time, the pair of engaging shoulders 5 raised from the walls 3a of the shank 3 are brought into elastic engagement with the remaining opposed edges of the fitting hole 12. As the result, the shank 3 of the grommet 1 is retained in the fitting hole.

If a dimensional error occurs between the shank 3 and the fitting hole 12 or if the shank 3 is inserted into the fitting hole 12 in a deviated manner, while the shank 3 is retained in the oblong fitting hole 12, the elastic engagement of the pair of elastic arms 6 with the edges of the fitting hole 12 overcomes the force with which the engaging shoulders 5 are engaged with the fitting hole 12 and causes the shank 3 of the grommet 1 to be automatically centered inside the fitting hole and therefore correctly retained at the center of the fitting hole 12.

If a dimensional error due to manufacture or fabrication is occurs between the distance between the pair of engaging shoulders 5 and the diameter of the fitting hole in the longitudinal direction, the engaging shoulders 5 absorb this error by virtue of a bend which produced in the upper portions the walls 3a which have a decreased thickness. Even from this point of view, the engagement of the shank 3 of the grommet 1 in the correct posture can be ensured.

The openings of the screw sockets 4 are then aligned with the through holes 14 bored in the part 13 of synthetic resin and screw members 15 are helically driven into the screw sockets 4 past the through holes 14 of the part 13. Thus, the screw members 15 are driven down between the inner surfaces of the lower portions of the walls 3a which have an increased thickness and the opposed walls 3a are forcibly spread outward. As a result, the pair of engaging shoulders 5 engage the opposed edges of the fitting hole 12 with an increased force.

Even if a spacing error in the bored holes prevents the centers of the fitting holes 12 in the mounting panel 11 from coinciding with those of the through holes 14 in the parts 13 and consequently prevents the screw sockets 4 of the grommets 1, which are centered in the fitting holes 12, from coinciding with the through holes 14 of the part 13, the forcible helical insertion of the screw members 15 into the screw sockets 4 enables the grommets to automatically absorb the spacing error between the fitting holes and the through holes 14. This is due to the bend produced in the pair of elastic arms 6, by virtue of the empty spaces 7, which overcomes the force with which the engaging shoulders 5 are attached to the fitting holes 12 and causes the shanks 3 of the grommets 1 to easily slide inside the oblong fitting holes 12 in the proper direction to absorb the error.

Moreover, in the present embodiment, because the screw sockets 4 are shaped in an oblong cross section, it naturally follows that the error mentioned above can also be absorbed by suitably varying the position at which the screw member 15 is driven into the screw socket.

If the ambient temperature changes and after fixation of the grommets 1 on a mounting panel 11 and, as the result, the part 13 expands or contracts to induce a variation in the relative positions of the fitting holes 12 and the through holes 14, the screw grommets of the present embodiment are capable of automatically and infallibly absorbing the variation in hole positions due to the change in the ambient temperature because the shanks 3 of the grommets 1 are allowed to easily slide inside the oblong fitting holes 12 by virtue of the bending in the pair of elastic arms 6 due to the empty spaces 7.

If an error in manufacture or fabrication or a change in the atmospheric temperature induces a variation in the relative positions of the holes, the present embodiment always ensures engagement of the shanks 3 of the grommets in the correct posure and not in an oblique posture in the fitting holes. The part 13 will therefore eventually be fixed accurately and firmly onthe mounting panel 11.

Even when a packing material (not shown) is attached to the lower surface of the enlarged head part 2, the fact that in the present embodiment the grommets 1 are always fixed in the correct posture in the fitting holes 12 precludes the possibility that the packing material will be unevenly compressed and consequently prevented from manifesting waterproofing and shock-absorbing effects as expected.

Figure 5:
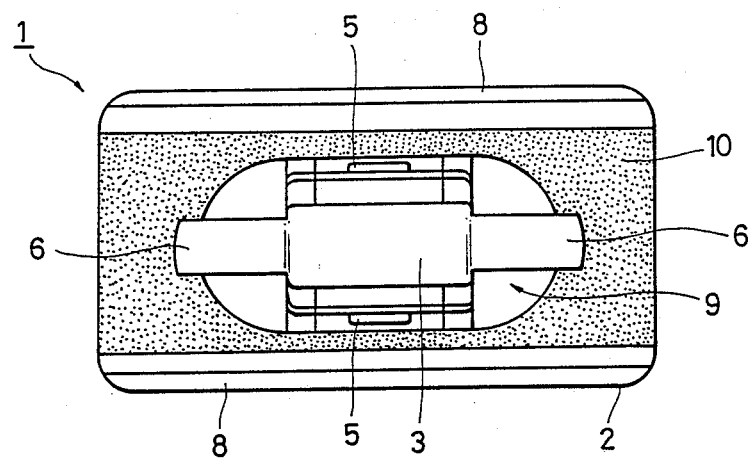
FIG. 5 is a bottom view illustrating a screw grommet of the second embodiment of the present invention.
Figure 6:
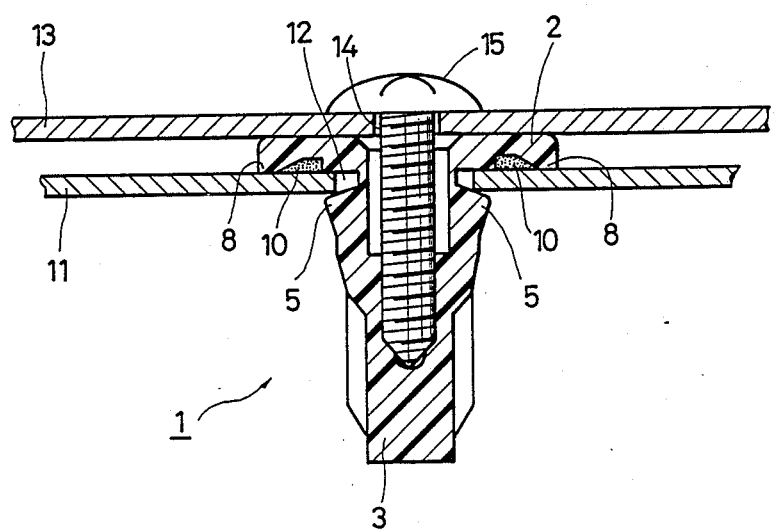
FIG. 6 is a cross section illustrating in a schematic form the condition in which a part is fixed on a mounting panel by the use of the screw grommet of FIG. 5.

A screw grommet according to a second embodiment of this invention will now be described below. The grommet of this second embodiment has a construction similar to the first embodiment described above. It is characterized, as illustrated in FIG. 5 and FIG. 6, by additionally having a pair of posture-retaining ribs 8 for abutment against the surface of the mounting panel 11 extend integrally downward from opposite longitudinal edges on a lower surface of an enlarged head part 2. A packing material 10, for example of sponge sheet, is attached within an empty space 9 defined by the pair of posture-retaining ribs 8 and the lower surface of the head part 2.

The grommet 1 of the second embodiment, therefore, cannot be defectively attached. If immoderate insertion of the screw member 15 into the screw socket 4 or an irregularlity of the surface of the mounting panel 11 compels the grommet 1 to be fitted obliquely in the fitting hole 12, the fact that the two posture-retaining ribs 8 contact the surface of the mounting panel 11 prevents inclination of the grommet and enables the packing material 10 to be compressed in a uniform state between the lower surface of the head part 2 and the upper surface of the mounting panel 11.

With the second embodiment, therefore, the possbility of the grommet 1 being attached obliquely so as to compress the packing material 10 non-uniformly and prevent the packing material 10 from manifesting the waterproofing and shock-absorbing efects as expected is absolutely nil.

The remainder of the construction of the second embodiment and the operation of the second embodiment for the absorption of error due to manufacture, or fabrication or variation in the relative positions of the holes due to a change in the ambient temperature are entirely the same as those of the first embodiment. In the diagrams depicting these two embodiments, therefore, like parts are denoted by like symbols. A specific description of the construction and operation is omitted.

As described above, the present invention is characterized by a pair of integral elastic arms extending from the shank of the grommet and a pair of engaging shoulders adapted to engage the corresponding edges of an oblong fitting hole bored in a mounting panel. The engagement of the pair of engaging shoulders enables the shank of the grommet to be safely and firmly attached to the oblong fitting hole and the engagement of the pair of elastic arms enables the shank of the grommet to be automatically centered within the fitting hole and always retained correctly at the center of the fitting hole. Thus, the grommet can be retained in the correct posture within the fitting hole even if a dimensional error occurs between the size of the shank of the grommet and the diameter of the fitting hole.

If a spacing error occurs in the positions of the bored holes and prevents the centers of the oblong fitting holes in the mounting panel from coinciding with the through holes on the part side, the insertion of the screw members into the screw sockets in the grommet permits perfect absorption of the spacing error due to the bending of the pair of elastic arms enables the shanks of the grommets to be readily moved within the oblong fitting holes. If the part of synthetic resin is expanded or contracted by a change in the ambient temperature after fixation of the grommet to the mounting panel so as to induce a variation in the relative positions of the fitting holes and the through holes, this relative variation due to the temperature change can be automatically and completely absorbed because the shanks of the grommets are allowed to move within the oblong fitting holes proportionately to the relative variation in the positions of the holes. The absorption of errors of a varying nature constitutes a salient feature of the present invention.

In the present invention, therefore, accurate and firm fixation of parts to a mounting panel is ensured because the shanks of the grommets can always be retained in the correct posture in the oblong holes under all conditions.

If a packing material is attached to the lower surface of the enlarged head part for the purpose of imparting waterproofing and shock-absorbing effects thereto, the packing material can be expected to manifest the waterproofing and shock-absorbing effects to satisfaction because the possibility of the grommet being retained in an oblique state to induce uneven exertion of a load and compress the packing material unevenly is perfectly nil.

In this case, the grommet may additionally have a pair of posture-retaining ribs for abutment against the surface of the mounting panel extending integrally downward from the lateral edges of the lower surface of the enlarged head part and a packing material attached in an empty spaced defined by the posture-retaining ribs and the lower surface of the head part. In this construction, the uneven compression of the packing material can be prevented because the packing material is compressed in a uniform state between the lower surface of the head part and the upper surface of the mounting panel.

What is claimed is:

1. A screw grommet for insertion in an oblong fitting hole of a mounting panel, comprising:
    an enlarged head adapted to abut against the mounting panel;
    a shank extending from said head, said shank including a first pair of opposed walls and a second pair of opposed walls;
    a pair of engaging shoulders adapted to engage first edges of the fitting hole, each one of said engaging shoulders extending from an associated one of said first pair of walls near the end of said walls closest to said head;
    a pair of elastic arms, each one of said elastic arms having an end connected to an associated one of said second pair of walls near the end of said walls farthest from said head, each of said arms extending toward said head at a prescribed angle oblique to the plane of said associated one of said second pair of walls, a free end of each of said arms adapted to engage second edges of the fitting hole;
    at least two ribs extending from said head in the direction of said shank, each of said ribs having a free end adapted to abut the mounting panel, said free ends and a surface of said head adjacent said shank defining a space;
    packing material disposed within said space; and
    a screw socket open at said head and extending into said shank, whereby said grommet will be retained within the fitting hole by said head, said engaging shoulders and said arms, and a screw can be inserted within said socket.

2. A screw grommet as in claim 1, wherein at least portions of said first pair of walls adjacent said engaging shoulders have a reduced thickness.

3. A screw grommet as in claim 1, wherein said screw socket has an oblong cross-section, whereby the screw can be inserted in said socket at any point along the long axis of said cross-section.

4. A screw grommet as in claim 3, wherein at least portions of said first pair of walls adjacent said engaging shoulders have a reduced thickness.

5. A screw grommet for insertion in an oblong fitting hole of a mounting panel, comprising:
    an enlarged head adapted to abut against the mounting panel;
    a shank extending from said head, said shank including a first pair of opposed walls and a second pair of opposed walls;
    a pair of engaging shoulders adapted to engage first edges of the fitting hole with a first force, each one of said engaging shoulders extending from an associated one of said first pair of walls near the end of said walls closest to said head;
    a pair of elastic arms, each one of said elastic arms having an end connected to an associated one of said second pair of walls near the end of said walls farthest from said head, each of said arms extending toward said head at a prescribed angle oblique to the plane of said associated one of said second pair of walls, a free end of each of said arms adapted to engage second edges of the fitting hole with a second force greater than said first force, whereby said second force overcomes said first force to center said shank within the oblong fitting hole; and
    a screw socket opens at said head and extending into said shank, whereby said grommet will be retained within the fitting hole by said head, said engaging shoulders and said arms, and a screw can be inserted within said socket.

6. A screw grommet as in claim 5, wherein at least portions of said first pair of walls adjacent said engaging shoulders have a reduced thickness.

7. A screw grommet as in claim 5, further including at least two ribs extending from said head in the direction of said shank, each of said ribs having a free end adapted to abut the mounting panel, said free ends and a surface of said head adjacent said shank defining a space; and packing material disposed within said space.

8. A screw grommet as in claim 5, wherein said screw socket has an oblong cross-section, whereby the screw can be inserted in said socket at any point along the long axis of said cross-section.

9. A screw grommet as in claim 8, wherein at least portions of said first pair of walls adjacent said engaging shoulders have a reduced thickness.

10. A screw grommet as in claim 8, further including at least two ribs extending from said head in the direction of said shank, each of said ribs having a free end adapted to abut the mounting panel, said free ends and a surface of said head adjacent said shank defining a space; and packing material disposed within said space.

* * * * *